United States Patent
Yoshimura et al.

(10) Patent No.: US 11,065,839 B2
(45) Date of Patent: Jul. 20, 2021

(54) TAPE ROLL, TAPE CARTRIDGE, AND METHOD FOR MANUFACTURING TAPE ROLL

(71) Applicant: Brother Kogyo Kabushiki Kaisha, Nagoya (JP)

(72) Inventors: Chisato Yoshimura, Nagoya (JP); Yoshikatsu Suito, Nagoya (JP); Chie Nakashima, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 71 days.

(21) Appl. No.: 16/144,377

(22) Filed: Sep. 27, 2018

(65) Prior Publication Data
US 2019/0105874 A1 Apr. 11, 2019

(30) Foreign Application Priority Data
Oct. 6, 2017 (JP) .............................. JP2017-195852

(51) Int. Cl.
| B32B 7/12 | (2006.01) |
| B41J 15/04 | (2006.01) |
| C09J 11/04 | (2006.01) |
| C09J 7/00 | (2018.01) |
| C09J 7/20 | (2018.01) |
| B41J 3/407 | (2006.01) |

(52) U.S. Cl.
CPC ............... *B32B 7/12* (2013.01); *B41J 3/4075* (2013.01); *B41J 15/044* (2013.01); *C09J 7/00* (2013.01); *C09J 7/20* (2018.01); *C09J 11/04* (2013.01); *B32B 2307/4023* (2013.01); *B32B 2405/00* (2013.01)

(58) Field of Classification Search
CPC .......... B32B 7/12; B32B 2405/00; C09J 7/20; C09J 7/00; C09J 11/04; B41J 3/4075; B41J 15/044
See application file for complete search history.

(56) References Cited

U.S. PATENT DOCUMENTS

2014/0210935 A1 7/2014 Norimatsu
2016/0289031 A1 10/2016 Norimatsu et al.

FOREIGN PATENT DOCUMENTS

| EP | 3075804 A1 | 10/2016 |
| EP | 3300910 A1 | 4/2018 |
| JP | 2006-219605 A | 8/2006 |
| JP | 2013-082789 A | 5/2013 |
| JP | 2016-190956 A | 11/2016 |

OTHER PUBLICATIONS

Mar. 6, 2019—(EP) Extended Search Report—App 18196644.1.
Jun. 29, 2020—(JP) Notice of Reasons for Refusal—App 2017-195852.

*Primary Examiner* — Patricia L. Nordmeyer
(74) *Attorney, Agent, or Firm* — Banner & Witcoff, Ltd.

(57) ABSTRACT

The disclosure discloses a tape roll that winds a tape with a minimum radius R. The tape before being wound includes a flexible material layer. The flexible material layer includes flat plate-shaped reflectors inside and having a thickness T. On condition that a flexural modulus of the reflectors is G, a bending strength of the reflectors is A, and an average particle diameter of the reflectors is 2L, the reflectors satisfy the following relationships $R/L\{1-\cos(L/R)\}<A/G$, and $2L>T$.

15 Claims, 13 Drawing Sheets

[FIG. 1]
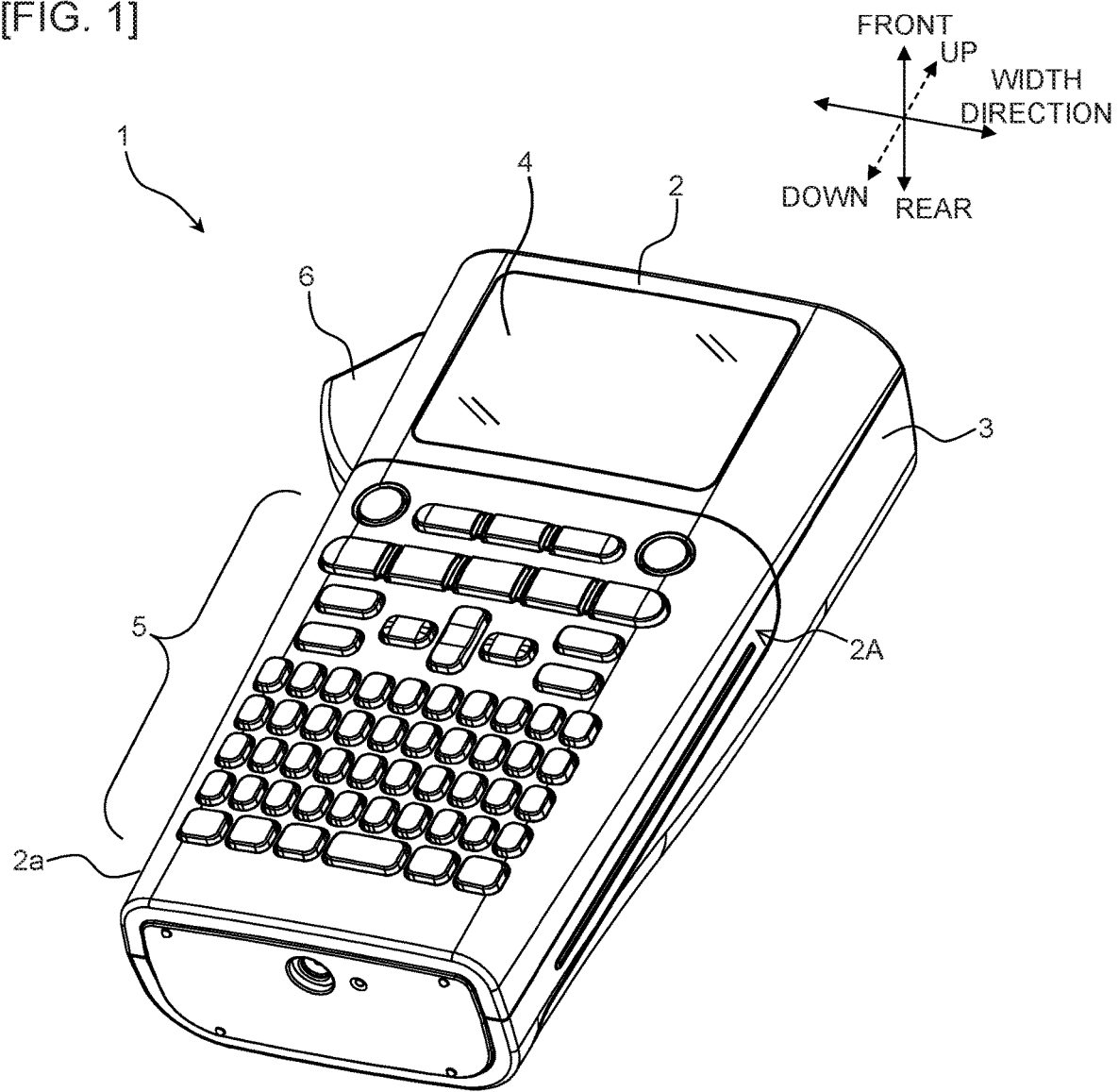

[FIG. 2]
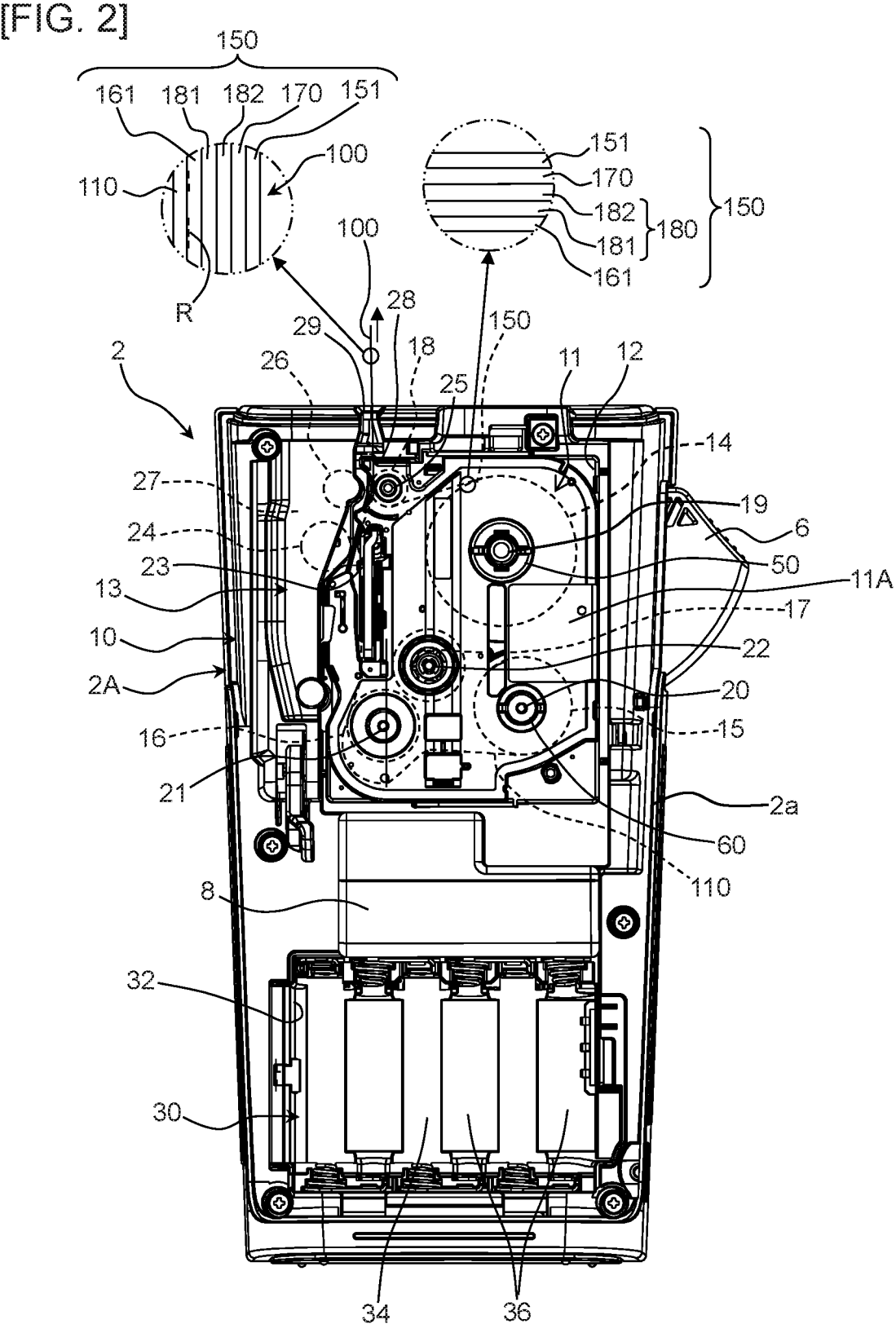

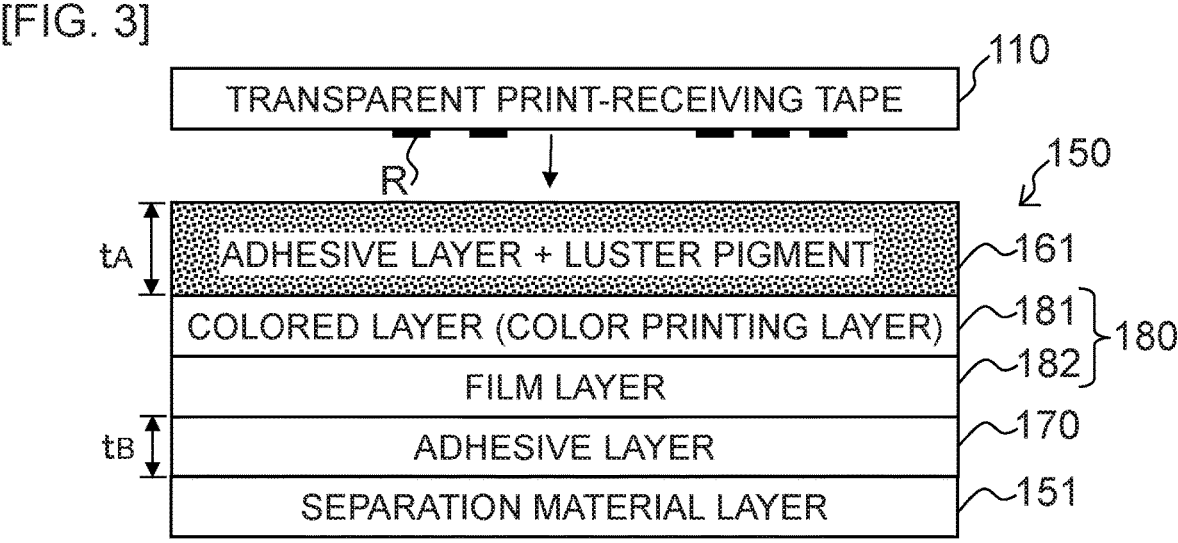
[FIG. 3]

[FIG. 4A]
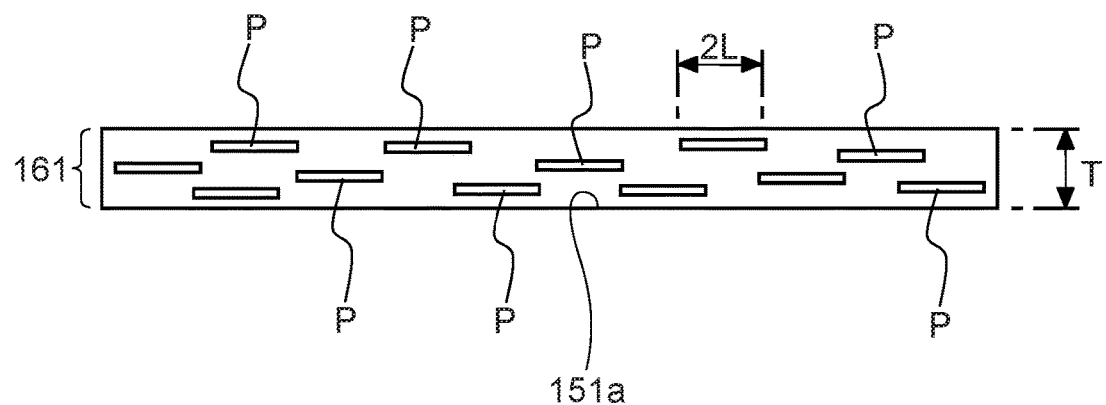
[FIG. 4B]
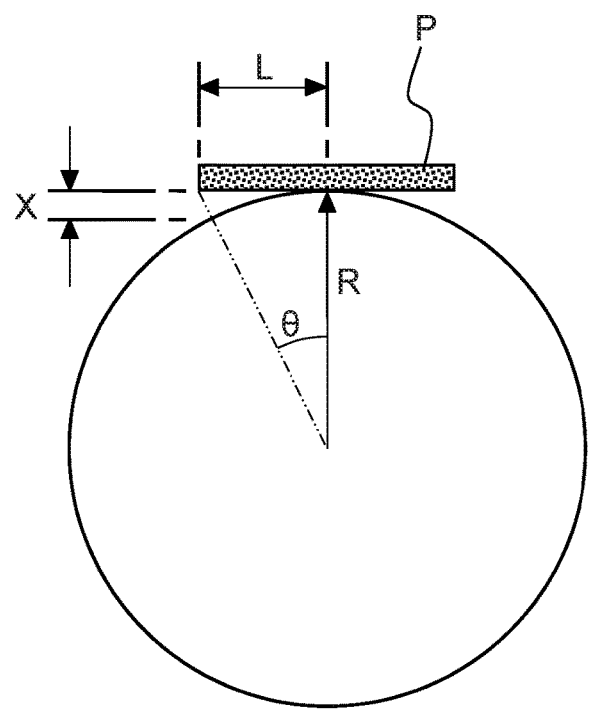

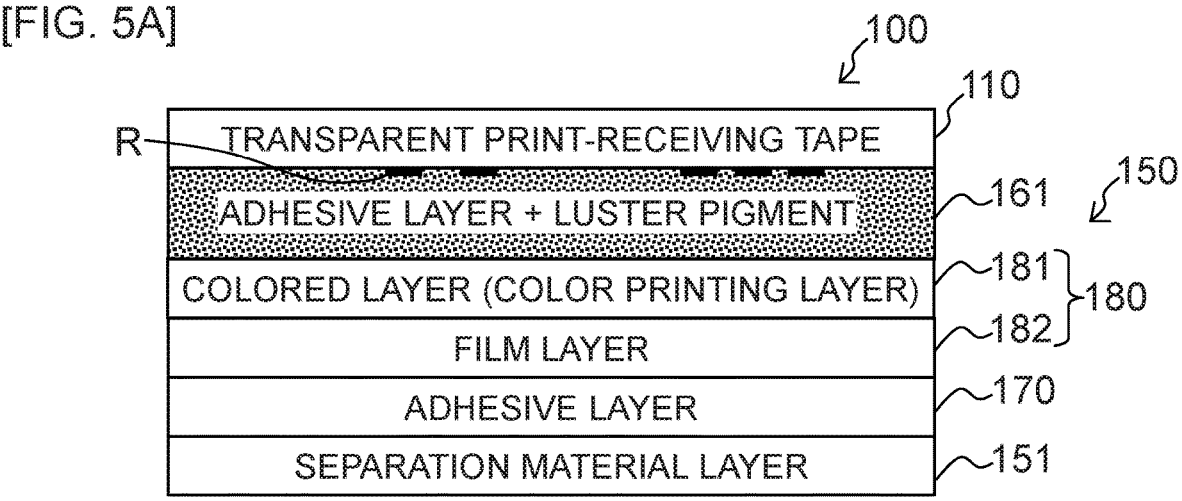
[FIG. 5A]
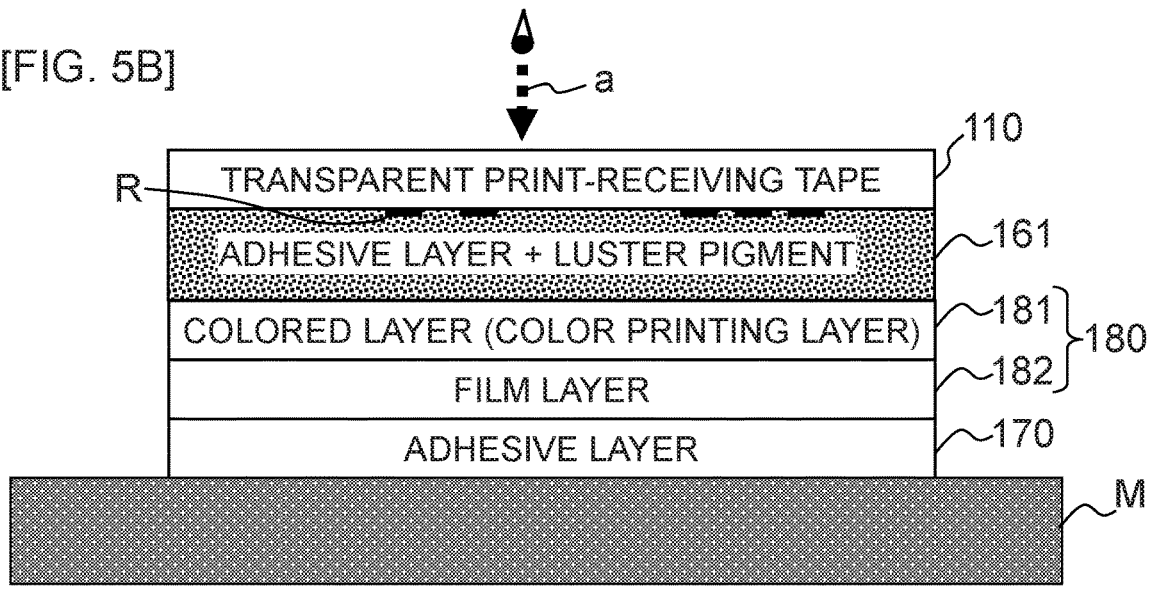
[FIG. 5B]

[FIG. 6A]
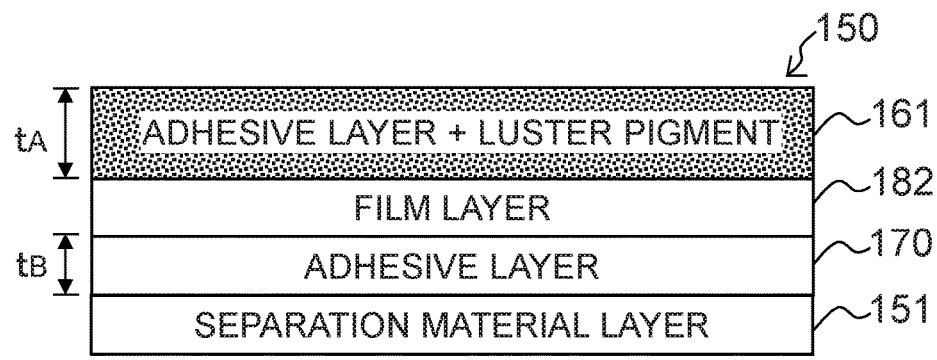
[FIG. 6B]
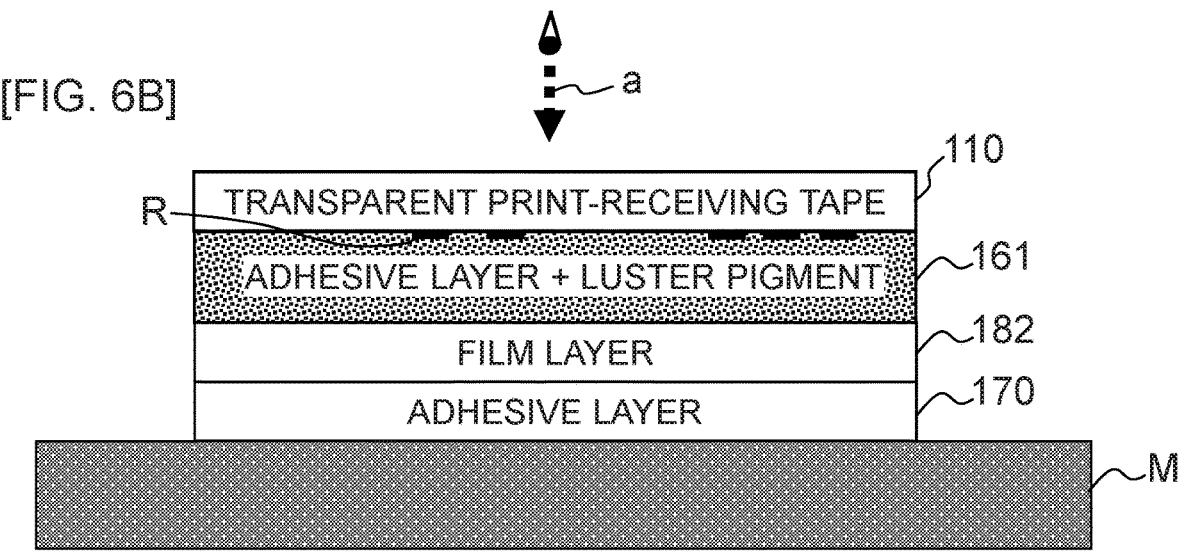

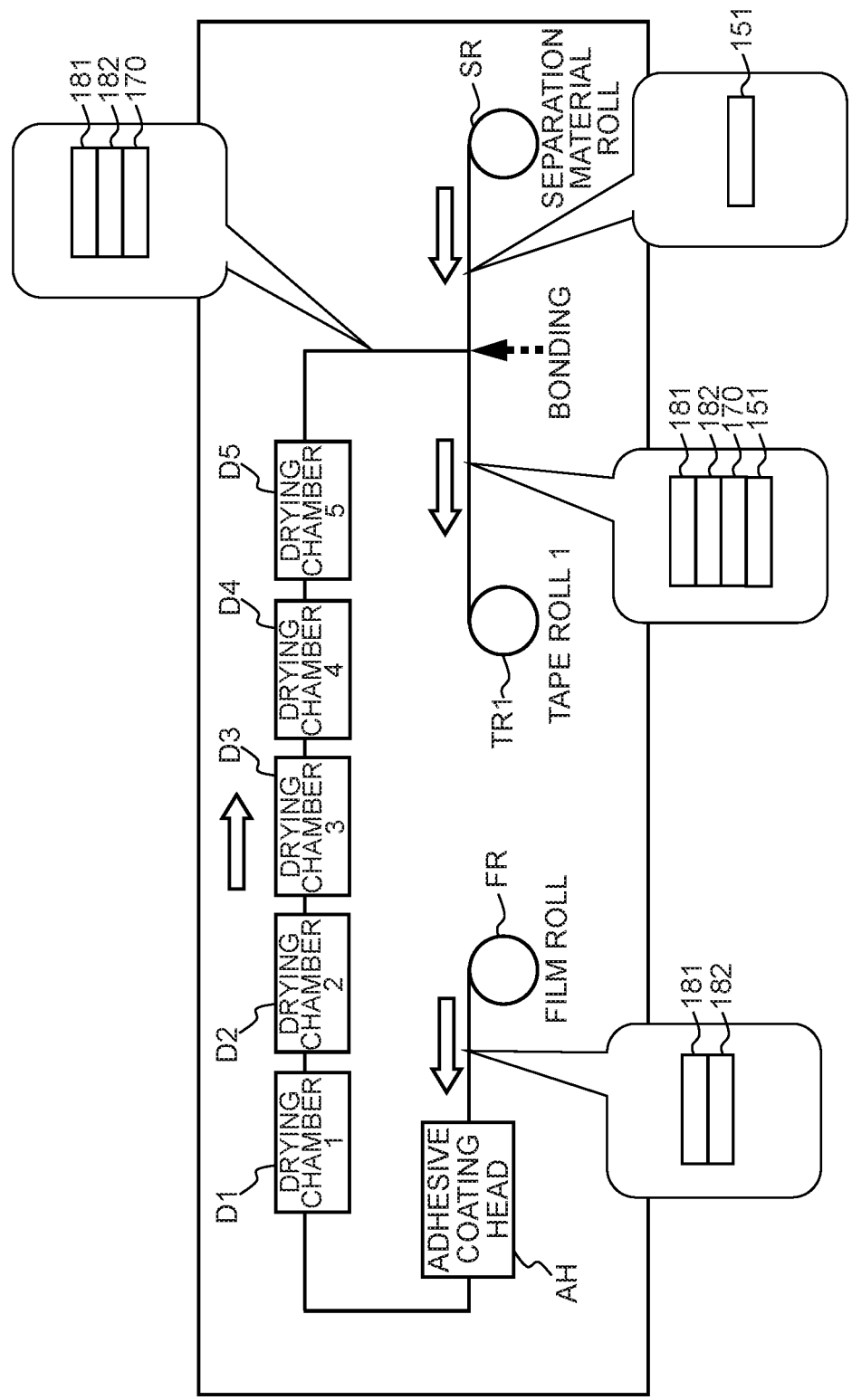
[FIG. 7]

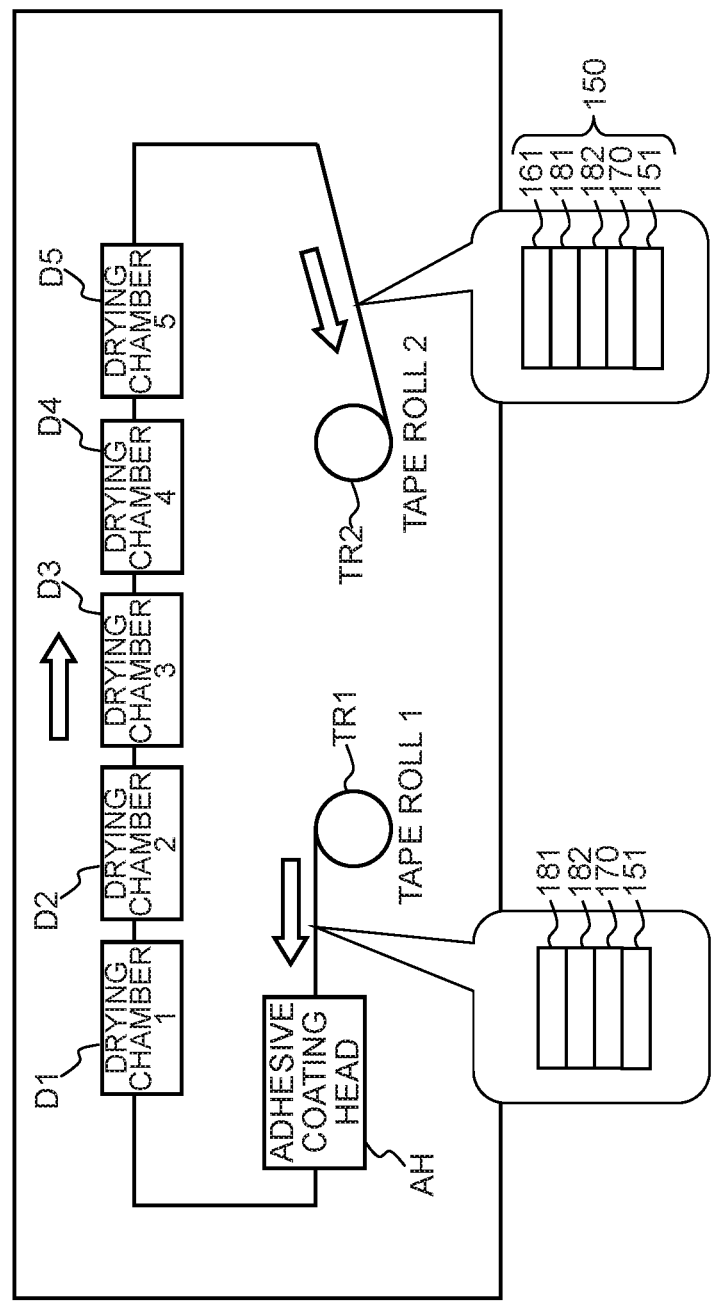
[FIG. 8]

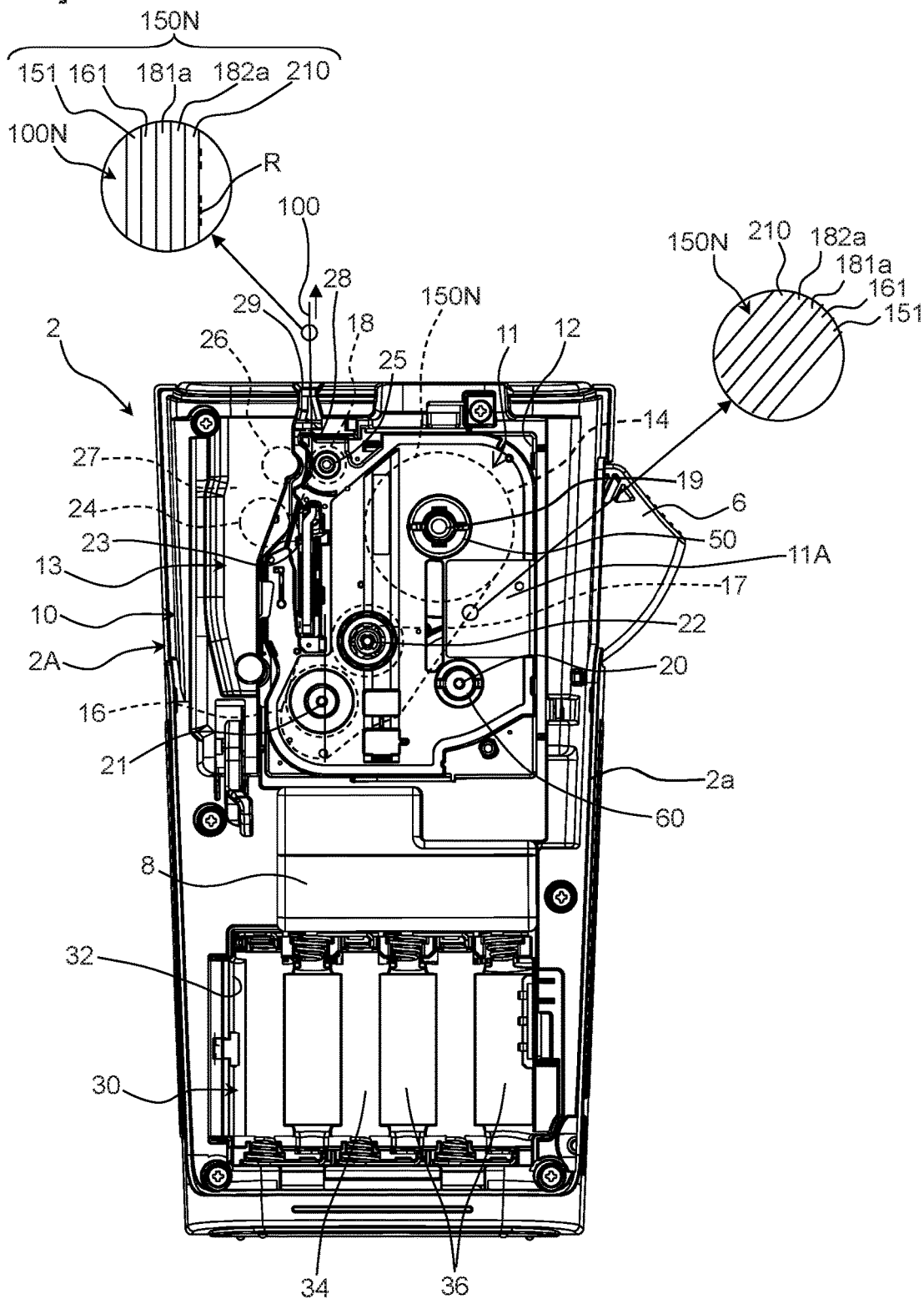
[FIG. 9]

[FIG. 10A]
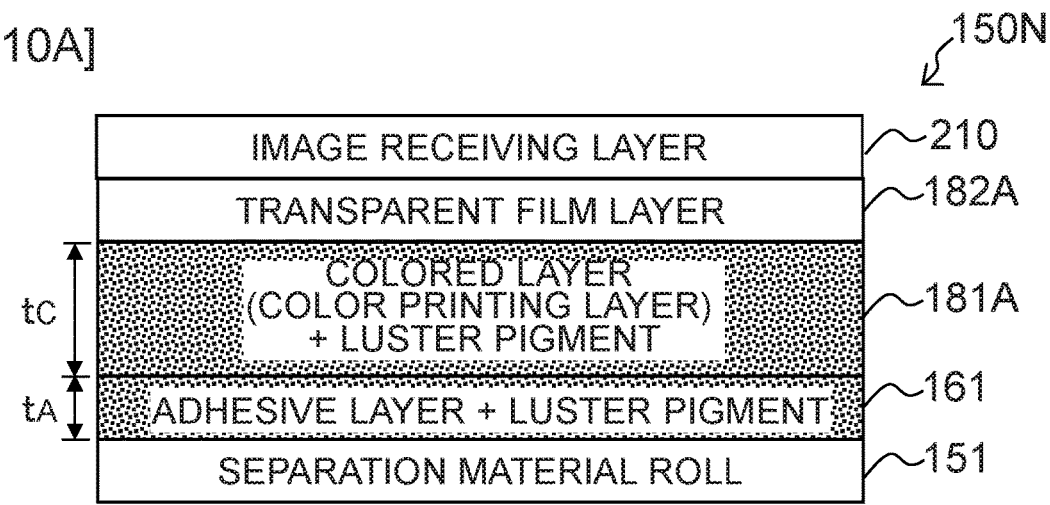
[FIG. 10B]
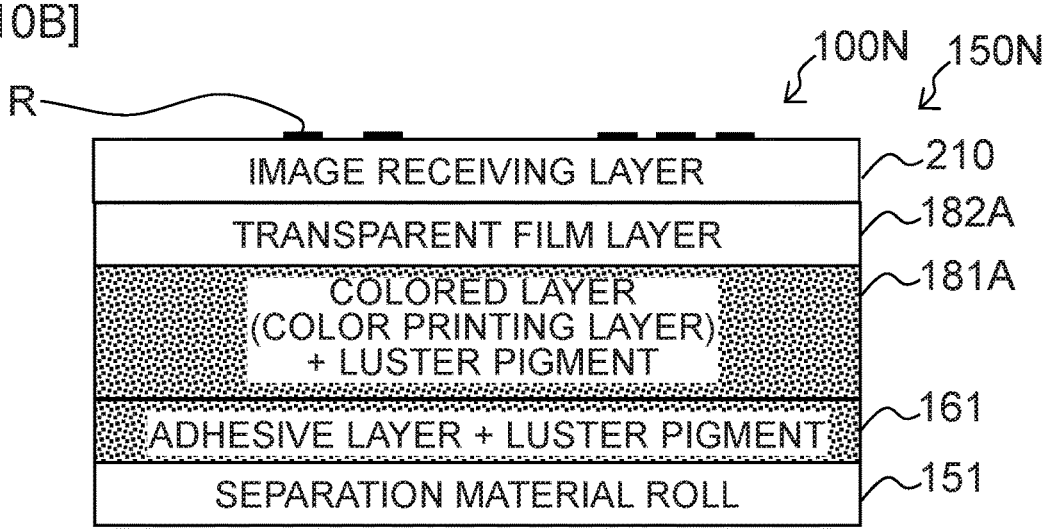

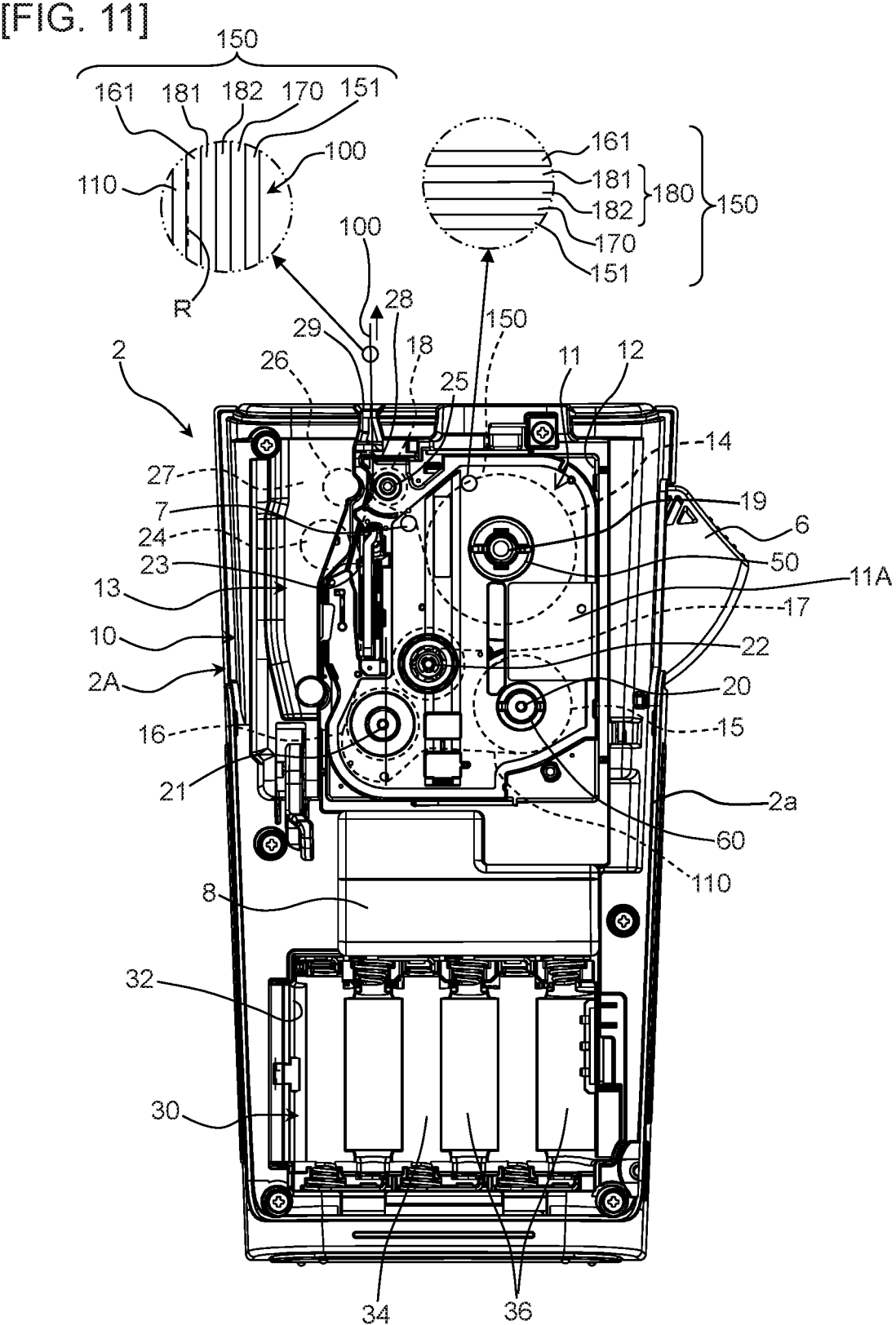
[FIG. 11]

[FIG. 12]
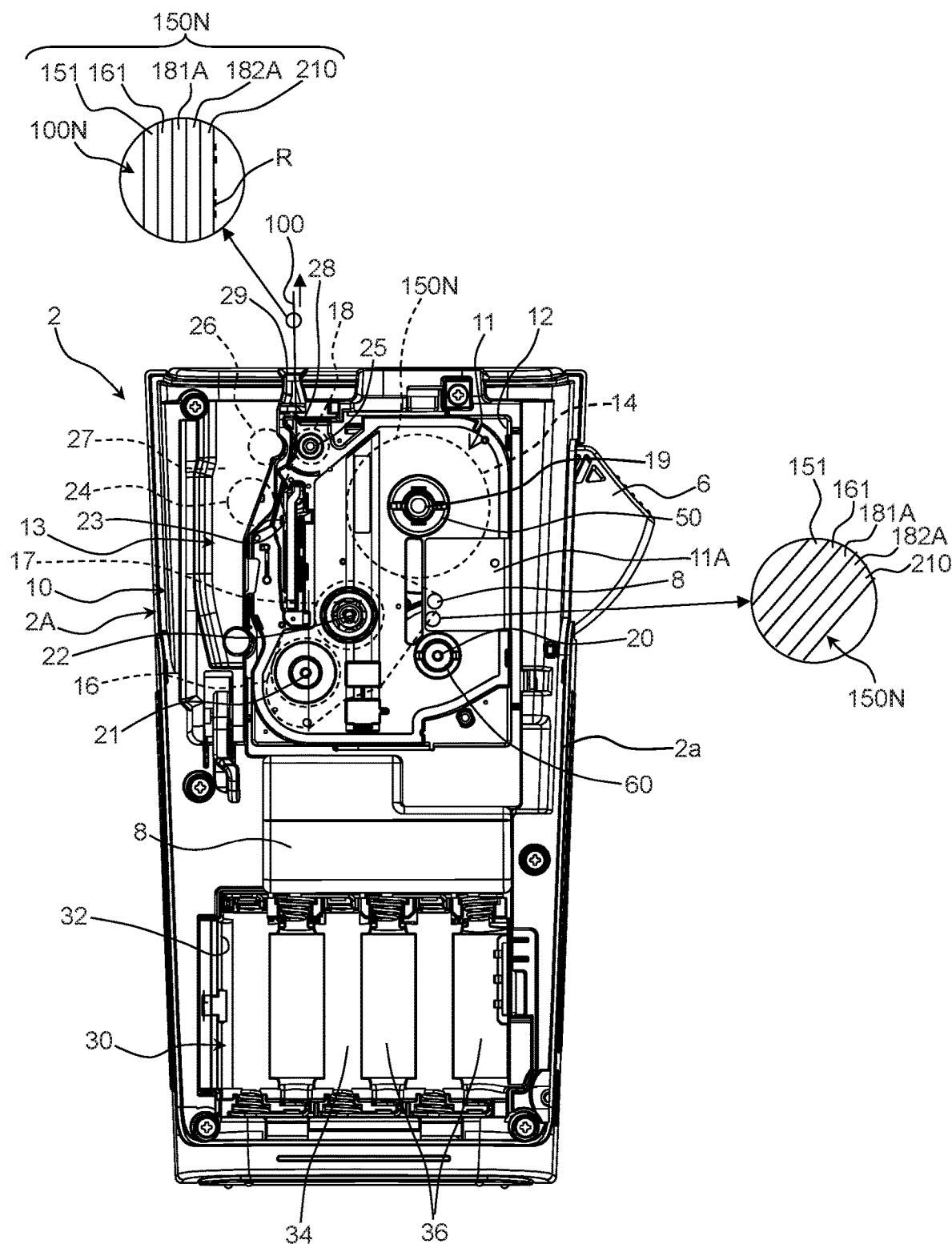

[FIG. 13A]
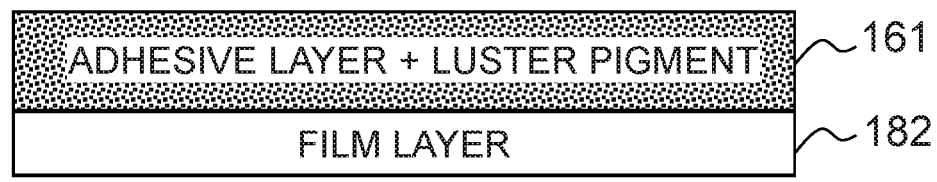
[FIG. 13B]
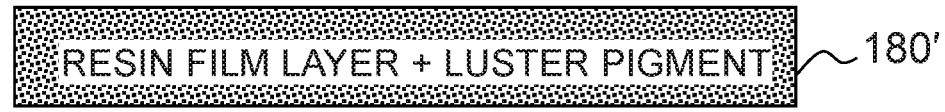

TAPE ROLL, TAPE CARTRIDGE, AND METHOD FOR MANUFACTURING TAPE ROLL

CROSS-REFERENCE TO RELATED APPLICATION

The present application claims priority from Japanese Patent Application No. 2017-195852, which was filed on Oct. 6, 2017, the disclosure of which is incorporated herein by reference in its entirety.

BACKGROUND

Field

The present disclosure relates to a tape roll formed by winding a tape, a tape cartridge comprising the tape roll, and a method for manufacturing a tape roll.

Description of the Related Art

A tape roll formed by winding a tape and a tape cartridge comprising the tape roll are already known. In this prior art, the tape has a layer structure including two adhesive layers sandwiching a base film (a first adhesive layer serving as a bonding adhesive layer and a second adhesive layer serving as a mounting adhesive layer) and a separation material layer (separation sheet).

In the tape having the layer structure described above, it is conceivable that pigment (e.g., reflectors) is added to obtain desired color appearance/glossy appearance from coloring. However, even though the reflectors are merely added, since the tape is curved into a roll shape, for example, when the tape is rolled into a tape roll, further improvement is required for maintaining a shiny appearance of the reflectors.

SUMMARY

An object of the present disclosure is to provide a tape roll, a tape cartridge, and a method for manufacturing a tape roll capable of suppressing deterioration of shiny appearance of a tape when reflectors are added.

In order to achieve the above-described object, according to the aspect of the present application, there is provided a tape roll that winds a tape with a minimum radius R, the tape before being wound comprising a flexible material layer, the flexible material layer comprising flat plate-shaped reflectors inside and having a thickness T, on condition that a flexural modulus of the reflectors is G, a bending strength of the reflectors is A, and an average particle diameter of the reflectors is 2L, the reflectors satisfy the following relationships: $R/L\{1-\cos(L/R)\} < A/G$; and $2L > T$.

As a result, when the tape is wound with the minimum radius R, the strain applied to the flat plate-shaped reflectors can be made smaller than the bending strength of the reflectors. Consequently, cracking of the reflectors can be suppressed, so that the shiny appearance of the tape can be prevented from deteriorating due to the cracking resulting in formation of voids (air bubbles) in the flexible material layer. Additionally, since the adhesive layer configuration in the relationship of $2L > T$ prevents the reflectors P from being arranged in a direction perpendicular to the flexible material layer, the sight direction and the reflection direction are not coincident with each other, so that efficiency of shining (reflection efficiency) does not decrease. Thus, a shine can efficiently be obtained.

BRIEF DESCRIPTION OF THE DRAWINGS

FIG. 1 is a perspective view showing an appearance on the front side of a print label producing apparatus to which an adhesive tape cartridge of a first embodiment of the present disclosure is attached.

FIG. 2 is a plan view showing an internal structure on the rear side of an apparatus main body of the print label producing apparatus.

FIG. 3 is a conceptual cross-sectional view showing a layer configuration of a transparent print-receiving tape and a double-sided adhesive tape.

FIG. 4A is an explanatory view showing a state of reflectors added to a first adhesive layer.

FIG. 4B is an explanatory view of parameters used in mathematical expressions for calculating the strength of the reflectors.

FIG. 5A is a conceptual cross-sectional view showing a layer configuration of a print tape.

FIG. 5B is a conceptual cross-sectional view showing a state in which a print tape is affixed to an adherend.

FIG. 6A is a conceptual cross-sectional view showing a layer configuration of a double-sided adhesive tape without a color printing layer.

FIG. 6B is a conceptual cross-sectional view showing a state in which a print tape using the double-sided adhesive tape shown in FIG. 6A is affixed to an adherend.

FIG. 7 is a diagram showing a manufacturing process of a double-sided adhesive tape.

FIG. 8 is a diagram showing a manufacturing process of a double-sided adhesive tape.

FIG. 9 is a plan view showing an internal structure on the rear side of the apparatus main body of the print label producing apparatus in a modification example in which a non-laminate type adhesive tape cartridge is used.

FIG. 10A is a conceptual cross-sectional view showing a layer configuration of an adhesive tape.

FIG. 10B is a conceptual cross-sectional view showing a layer configuration of a print tape.

FIG. 11 is a plan view showing an internal structure on the rear side of the apparatus main body of the print label producing apparatus in another modification example in which a laminate type adhesive tape cartridge is used.

FIG. 12 is a plan view showing an internal structure on the rear side of the main body of the print label producing apparatus in another modification example in which a non-laminate type adhesive tape cartridge is used.

FIG. 13A is a conceptual cross-sectional view of an adhesive tape in the case of two layers, showing a modification example of the layer structure of the adhesive tape.

FIG. 13B is a conceptual cross-sectional view of an adhesive tape in the case of one layer, showing a modification example of the layer structure of the adhesive tape.

DETAILED DESCRIPTION OF THE PREFERRED EMBODIMENTS

Embodiments of the present disclosure will now be described with reference to the drawings. In the following description, unless otherwise specified, directions of "up", "down", "front", "rear", and "width" are based on directions of arrows in FIG. 1.

First Embodiment

FIGS. 1 to 8 show a first embodiment of the present disclosure.

<Overall Structure of Printing Label Producing Apparatus>

In FIG. 1, the print label producing apparatus 1 is, for example, a hand-held electronic device held by a user's hand. The print label producing apparatus 1 includes an apparatus main body 2 and a cover 3 detachably attached to a rear surface of the apparatus main body 2.

The apparatus main body 2 has a housing 2A having a thin and flat substantially rectangular parallelepiped shape elongated in the up-down direction, and a front surface of the housing 2A is disposed with a liquid crystal display part 4 for displaying print data, a setting screen, etc. on an upper portion and a keyboard part 5 for operating the print label producing apparatus 1 on the lower side of the liquid crystal display part 4. The keyboard part 5 has keys arranged thereon including character keys of characters, signs, numeric characters, etc. as well as various function keys. A cut operation lever 6 for cutting a label tape with print is disposed on an upper portion of a side wall part 2a of the housing 2A on one side in the width direction.

<Label Producing Mechanism of Print Label Producing Apparatus>

As shown in FIG. 2, the apparatus main body 2 includes a label producing part 10 and a battery storage part 30. The label producing part 10 and the battery storage part 30 are partitioned by a containing part containing a control substrate, a motor, etc. not shown. The battery storage part 30 has a rectangular recessed part 32, and a plurality of shallow recessed parts 36 extended in the up-down direction is disposed on a bottom 34 of the recessed part 32 along the width direction. The battery storage part 30 stores therein the same number of multiple dry-cell batteries not shown in each of two upper and lower stages.

The label producing part 10 includes a concave-shaped cartridge holder 12 for detachably attaching an adhesive tape cartridge 11 disposed to occupy a large portion of a substantially upper half of the apparatus main body 2, and a printing and feeding mechanism 13 disposed in a region including the other side in the width direction of the cartridge holder 12.

In this embodiment, the adhesive tape cartridge 11 is a so-called laminate type and includes an adhesive tape roll 14, a print-receiving tape roll 15, an ink ribbon roll 16, an ink ribbon take-up roller 17, and a feeding roller 18 inside a housing 11A.

The adhesive tape roll 14 is formed by winding an adhesion tape (hereinafter referred to as "adhesive tape") 150 around a spool 50. The print-receiving tape roll 15 is formed by winding a transparent or semitransparent print-receiving tape 110 around a spool 60.

As shown in enlarged views enclosed with two circles indicated by dashed-two dotted lines in FIG. 2, the adhesive tape 150 includes a first adhesive layer 161, a color printing layer 181 and a film layer 182 serving as a base film (base layer) 180, a second adhesive Layer 170, and a separation material layer 151 laminated in this order from the spool 50 located on the radial center side (corresponding to the upper side shown in FIG. 3 described later) toward the radial outside (corresponding to the lower side in FIG. 3 described later). The layer structure of the adhesive tape 150 is not limited to this structure. Either of the color printing layer 181 and the separation material layer 151 may not be included. The base film 180 may be formed as a layer reflecting light or may be formed as a layer transmitting light.

The printing and feeding mechanism 13 includes a support shaft 19 of the adhesive tape roll 14, a support shaft 20 of the print-receiving tape roll 15, a support shaft 21 of the ink ribbon roll 16, a drive shaft 22 of the ink ribbon take-up roller 17, a thermal head 23, a platen roller 24, a drive shaft 25 of the feeding roller 18, a pressure roller 26, etc. The platen roller 24 and the pressure roller 26 are attached together to the roll holder 27 and can be switched by swinging of the roll holder 27 between a printing and feeding position (position shown in FIG. 2) causing contact with the thermal head 23 and the feeding roller 18, respectively, and a standby position (not shown) away from the thermal head 23 and the feeding roller 18.

When a print label is produced, the platen roller 24 and the pressure roller 26 are switched to the printing and feeding position. The platen roller 24 switched to the printing and feeding position is driven to rotate by a drive shaft not shown on the apparatus main body 2 and presses the print-receiving tape 110 fed out from the print-receiving tape roll 15 and an ink ribbon not shown fed out from the ink ribbon roll 16 against the thermal head 23. As a result, ink of the ink ribbon is transferred to the print-receiving tape 110 by heat received from the thermal head 23 to form a desired print R (see FIG. 3 etc. described later) on the print-receiving tape 110 is formed, and the platen roller 24 feeds the print-receiving tape 110 and the ink ribbon after the print formation toward the feeding roller 18. The ink ribbon after the print is subsequently separated from the print-receiving tape 110 and taken up by the ink ribbon take-up roller 17.

On the other hand, the pressure roller 26 switched to the printing and feeding position presses the print-completed print-receiving tape 110 fed by the platen roller 24 and the adhesive tape 150 fed out from the adhesive tape roll 14 against the feeding roller 18 driven to rotate by the drive shaft 25. As a result, as shown in the enlarged view enclosed with the circle on the left side indicated by the dashed-two dotted line in FIG. 2 (see also FIGS. 3 and 5 described later), while the print-receiving tape 110 having the print R formed thereon and the adhesive tape 150 are bonded to form a print tape 100, the feeding roller 18 feeds the print tape 100 toward a label discharging exit 29 disposed at an upper end of the apparatus main body 2. When a user manually operates the cut operation lever 6 at a predetermined time point of discharge of the print tape 100 from the label discharging exit 29, a cutter 28 located in the vicinity of the label discharging exit 29 is actuated to cut the print tape 100. A print label (not shown) is a portion cut (separated) from the print tape 100.

As shown in FIG. 3, the adhesive tape 150 has the film layer (base layer) 182, the color printing layer (base layer) 182 disposed in contact with the upper side of the film layer 182 in FIG. 3, the first adhesive layer 161 disposed in contact with the upper side of the color printing layer 181 in FIG. 3, the second adhesive layer 170 disposed in contact with the lower side of the film layer 182 in FIG. 3, and the separation material layer 151 covering the second adhesive layer 170, disposed in contact with the lower side of the second adhesive layer 170.

In this state, as schematically shown in FIG. 4A, this embodiment is characterized in that flat plate-shaped reflectors P made of luster pigment and having an average particle diameter 2L are added into an adhesive constituting the first adhesive layer 161. The flat plate-shaped reflector P may be contained inside the adhesive (flexible material layer).

Although a detailed structure is not shown, the reflectors P added to the first adhesive layer 161 in the adhesive tape roll 14 are made of, for example, a flat plate-shaped base material and a covering material covering the surface of the base material. The base material can contain mica, a glass compound, etc. A covering material can contain metal oxide etc. More specific materials etc. thereof will be described later.

The adhesive used for the first adhesive layer 161 may be either colorless or colored transparent. The reflectors P may be either colorless or colored. In addition, by including the colorless and transparent first adhesive layer 161 and the colored color printing layer 181, a shining function from the reflectors P of the first adhesive layer 161 and a coloring function from the first adhesive layer 161 transmitted through the first adhesive layer 161 can sufficiently be achieved as compared to the case that both of the functions are mixed in one layer (only in the case that the first adhesive layer 161 is colored and transparent). Particularly in the case that luster pigment is used as the reflectors P, by arranging the functions such that the first adhesive layer 161 on one side in the thickness direction (e.g., the upper side) is colored by the luster pigment while the other side (e.g., the lower side) is colored by the color printing layer 181, both the coloring appearance and the luster appearance can visually be recognized when viewed from one side in the thickness direction.

As described above, if the reflectors P added to the first adhesive layer 161 of the adhesive tape 150 are cracked due to deformation (bending) associated with a curvature (varying depending on the winding position) when the adhesive tape 150 is wound into a roll shape as the adhesive tape roll 14, voids are formed in the first adhesive layer 161, and the shiny appearance as designed is impaired. However, even if an average particle diameter 2L of the reflectors P is reduced so as not to cause the deformation, an absence of the reflectors P tends to occur in the thickness direction, leading to formation of voids (air bubbles) as in the case of the cracking, and, the shiny appearance as designed is impaired.

Therefore, as shown in FIG. 4A, in the case of the adhesive tape 150 including the film layer 182 and the first adhesive layer 161 having a thickness T disposed on one side (surface 182a) of the film layer 182 in the thickness direction with the flat plate-shaped reflectors P (e.g., luster pigment particles) contained in the first adhesive layer 161, the cracking of the reflectors P is prevented from occurring due to even the curvature close to a minimum radius R when the adhesive tape 150 is wound into a roll shape. Specifically, when having a flexural modulus of G, a bending strength of A, and an average particle diameter of 2L, the reflectors P satisfy the following relationship:

$$\frac{R}{L} * \left\{1 - \cos\left(\frac{L}{R}\right)\right\} < \frac{A}{G} \quad (1)$$

As a result, when the adhesive tape 150 is wound with the minimum radius R, the strain applied to the flat plate-shaped reflectors P can be made smaller than the bending strength of the reflectors P. Consequently, the reflectors P can be prevented from cracking, so that the shiny appearance of the tape can be prevented from deteriorating due to the cracking resulting in formation of voids (air bubbles) in the first adhesive layer 161. In this way, when the reflectors P are added, the shiny appearance of the adhesive tape 150 can be prevented from deteriorating due to the cracking of the reflectors P.

In this case, the following relationship is preferably satisfied:

$$2L > T \quad (2).$$

In the adhesive tape roll 14, the adhesive tape 150 is wound around the spool 50 serving as a winding core member. Therefore, strictly speaking, the radius of the spool 50 is smaller than the minimum radius R. Therefore, the minimum radius R shown in FIG. 4B is implemented with consideration given to the fact that the reflectors P are added into the first adhesive layer 161 having the thickness T and that a lower layer portion (e.g., the second adhesive layer 170 and the separation material layer 151) are present in a first turn.

In the case that the reflector P added to the first adhesive layer 161 has the average particle diameter 2L (radius L) and that an assumption in made on what length of the average particle diameter 2L causes cracking when θ is an angle formed by a line segment from the center Q of the minimum radius R including the center of the reflector P and a line segment from the center Q of the minimum radius R passing through an end portion of the reflector P and X is a maximum separation distance between a curved surface (virtual) of the minimum radius R and the reflector P, a strain X/L is calculated by Eq. (2) from $$\tan \theta = L/R \quad (3), \text{ and}$$

$$X = R(1 - \cos \theta) \quad (4)$$

when the maximum separation distance X is zero (when the reflector P is deformed to the maximum with the minimum radius R) as follows:

$$X/L = R(1 - \cos\theta)/L = R/L\{1 - \cos(\tan - 1 L/R)\}. \quad (1')$$

Approximation of Eq. (1') results in the left side of Eq. (1):

$$R/L\{1 - \cos(L/R)\}.$$

Furthermore, from the formula ε*E=σ, a strain smaller than the bending strength of a criterion: X/L<A/G is applied, so that the flat plate-shaped reflector P can be made hard to crack.

Specific Example: Mica

An example using Eq. (1) and Eq. (2) will be described as an example of applying the reflector P to mica (natural mica). Eq. (1) described above is an equation indicative of a length of the average particle diameter 2L causing cracking. It is assumed that mica has the bending strength of 1300 MPa and the flexural modulus of 8200 MPa. When mica has the radius L of 0.5 mm for the average particle diameter 2L and the minimum radius R of 8.5 mm, this leads to $$\frac{X}{L} = \frac{8.5}{0.5} * \left(1 - \cos\left(\operatorname{atan}\left(\frac{0.5}{8.5}\right)\right)\right) \approx 0.02934 \quad (5)$$

$$A/G = 1300/8200 \approx 0.15854 \quad (6), \text{ and}$$

the criterion (X/L<A/G); 0.02934<0.15854, and therefore, the average particle diameter 2L<1 mm can be obtained.

On the other hand, when the radius L is 0.25 mm, this leads to $$\frac{X}{L} = \frac{8.5}{0.25} * \left(1 - \cos\left(\operatorname{atan}\frac{0.25}{8.5}\right)\right) \approx 0.0147, \quad (5')$$

and the criterion (X/L<A/G); 0.0147<0.15854,
and therefore, the average particle diameter 2L=0.5 mm does not cause cracking.

When the lower limit value of the length of the average particle diameter 2L of the reflector P is smaller than the thickness T of the first adhesive layer 161, the reflector P is arranged in a direction perpendicular to the film thickness, which makes it difficult to match the sight direction and the reflection direction, so that efficiency of shining (reflection efficiency) decreases. Therefore, the minimum length of the reflector P preferably satisfies Eq. (2) as long as the reflector P does not crack. For example, the thickness T is about 25 µm.

As described above, the adhesive tape roll 14 is formed by winding the adhesive tape 150 with the minimum radius R; the adhesive tape 150 has the base film 180 and the first adhesive layer 161 having a thickness T, disposed in contact with one side (the upper side in the figures) of the base film 180 in the thickness direction; the first adhesive layer 161 includes flat plate-shaped reflectors P; and when the reflectors have the flexural modulus of G, the bending strength of A, and the average particle diameter of 2L, the reflectors P satisfy the following relationship:

R/L{1−cos(L/R)}<A/G.

As a result, when the adhesive tape 150 is wound with the minimum radius R, the strain applied to the flat plate-shaped reflectors P can be made smaller than the bending strength of the reflectors P. Consequently, cracking of the reflectors P can be suppressed, so that the shiny appearance of the adhesive tape 150 can be prevented from deteriorating due to the cracking resulting in formation of voids in the first adhesive layer 161. Additionally, since the reflectors P having a large average particle diameter can be contained due to the adhesive layer structure having the thickness T, a high-class appearance can be created. Since the transmissive reflectors P having a large average particle diameter are laminated, an elaborate glittering appearance can be created from multiple scattering. Since the reflectors P are transmissive and have a large average particle diameter, the underlying color printing layer can be seen through, and the thickness of the adhesive layer allows for creating a deep stereoscopic effect.

Since the reflectors P satisfy the relationship of

2L>T, in the case that the size (average particle diameter 2L) of the reflector P is equal to or less than the thickness T of the first adhesive layer 161, the reflectors P may be arranged in a substantially upright form in the thickness direction in the first adhesive layer 161. In such a case, the efficiency of shining due to reflection on the reflectors P is reduced. In the present disclosure, the average particle diameter 2L is made larger than the thickness T so that the arrangement in the form as described above can be suppressed, which also prevents the deterioration of the shiny appearance of the adhesive tape 150.

On the other hand, the print-receiving tape 110 has the print R applied on the surface on the side facing the adhesive tape 150 as described above. The print-receiving tape 110 is bonded to the adhesive tape 150 via the first adhesive layer 161.

FIG. 5A shows a layer configuration of the print tape 100 formed by bonding the print-receiving tape 110 and the adhesive tape 150, and FIG. 5B shows a state in which the print tape 100 is affixed to an adherend M by the second adhesive layer 170 after the separation material layer 151 is peeled off. As a result of the bonding, as shown in FIG. 5A, the print tape 100 includes the print-receiving tape 110, the first adhesive layer 161 (with the reflectors P added), the color printing layer 181, the film layer 182, the second adhesive layer 170, and the separation material layer 151 laminated in this order from the upper side toward the lower side of FIG. 5A.

In this configuration, as shown in FIG. 6, the first adhesive layer 161 may be disposed on the upper side of the film layer 182 in the figures without disposing the color printing layer 181 between the first adhesive layer 161 and the film layer 182.

The separation material layer 151 is formed by coating a base with a separation agent, for example. The base can be made of paper, a PET film, an OPP film, a polyethylene film, etc. The separation agent can be made of a silicone resin, a polyethylene resin, etc.

The adhesives of the first adhesive layer 161 and the second adhesive layer 170 can be urethane resin-based, silicone resin-based, vinyl resin-based, polyester resin-based, synthetic rubber-based, and natural rubber-based adhesives etc.

The reflectors P can be made by coating a surface of a core material (base material) such as scale-like mica, glass, and aluminum with a color material such as a titanium oxide and an iron oxide or a solid pigment as a color material. For some color tone of the reflectors P, those creating color from interference of reflected light of the core material are usable without coating the core material with the color material. The reflector P is a generic term for pigments (luster pigment particles) having luster properties and, for example, pearl pigments and metallic pigments are known.

The solid pigment in this case can be an inorganic pigment such as an oxide or an organic pigment such as a textile printing pigment. Examples of the inorganic pigment can include oxides such as titanium dioxide and zinc flower; hydroxides such as alumina white and yellow iron oxide; sulfides such as zinc sulfide and lithopone; chromium oxides such as chrome yellow and molybdate orange; silicates such as white carbon and clay; sulfates such as precipitated barium sulfate and baryta powder; carbonates such as calcium carbonate and white lead; and other pigments such as ferrocyanide (Prussian blue) and carbon (carbon black). Examples of the organic pigment can include textile printing pigments including basic dyes such as rhodamine lake and methyl violet lake, acid dyes such as quinoline yellow lake, vat dyes such as malachite green, and mordant dyes such as alizalin lake; azo pigments including soluble azo such as Carmine 6B, insoluble azo such as disazo yellow, condensed azo such as Cromophtal Yellow 3G, azo complex salt such as nickel azo yellow, and benzimidazolone azo such as Permanent Orange HL; phthalocyanine pigments such as phthalocyanine blue; condensed polycyclic pigments such as flavanthron yellow; nitro pigments such as Naphthol Yellow S; nitroso pigment such as pigment green B; day/night fluorescent pigments such as Lumogen yellow; and other pigments such as alkali blue.

More specifically, the reflectors P are flat plate-shaped luster pigment particles. For example, in the case of aluminum pigment, the luster pigment particles may have various shapes such as a granular shape, a plate shape, a lump shape, and a flake shape (scaly shape), and in the case that the particles are used as paint, the shape is preferably a flake shape so as to give the coating film an excellent metallic appearance and brightness. The flat plate shape may include not only a simple plate shape but also a flake shape (scaly shape) etc. Additionally, "flat" includes, for example, the case that irregularities or steps in the thickness direction (wavy shape etc.) are formed on a surface naturally or during processing. In other words, those having unevenness etc. generated in a manner not processible by polishing etc. are also included.

As described above, the reflectors P may be made of a base material and a covering material covering the surface of the base material. The base material can contain, for example, any of an inorganic compound (e.g., natural mica (mica), synthetic mica, silica, glass, alumina, titania, graphite), or a metal oxide (e.g., iron oxide, bismuth oxychloride), or metal (e.g., aluminum, zinc, copper, iron, bronze, nickel, titanium, stainless steel), or a liquid crystal polymer.

The covering material can contain at least any of a silicon oxide, a metal, and a metal oxide. The metal can contain aluminum, zinc, copper, iron, bronze, nickel, titanium, stainless steel, titanium dioxide etc., and the metal oxide can contain iron oxide etc.

For example, the metal oxide can contain an oxide of at least one element selected from the group consisting of magnesium, tin, zinc, cobalt, nickel, iron, zirconium, titanium, and cerium.

The luster pigment can be implemented by applying flake-shaped aluminum powder, mica flake particles or graphite flake particles coated with a metal oxide such as titanium dioxide or iron oxide, iron oxide particles mainly composed of α-iron oxide crystal particles, etc. These luster pigments shine by reflecting incident light from the outside on the surface thereof and can give a unique exterior appearance having a variety of excellent decorative properties to a painted surface when mixed in a paint, to a drawn line or a printed surface in the case of ink, or to a surface of a resin molded product in the case of a resin composition, in combination with the color tone of various base texture thereof.

For the luster pigment, for example, a multilayer structure may be employed by using scaly glass as a base material subjected to coating treatments with a rutile type titanium dioxide film, a cerium hydroxide coating, an amorphous silica coating, and a coupling agent in this order. The order of the cerium hydroxide coating and the amorphous silica coating may be reversed, and when the cerium hydroxide coating is disposed on the upper layer of the amorphous silica coating, the surface of the cerium hydroxide coating is coated with the coupling agent.

A representative example of the coupling agent can be a silane coupling agent. Although varying depending on a resin to be used, preferable examples of the silane coupling agent include vinylsilane, epoxysilane, methacryloxysilane, and aminosilane, and these silane coupling agents may be used alone or in combination.

Examples of vinylsilane include vinyltrichlorosilane, vinyltrimethoxysilane, vinyltriethoxysilane, etc.

Examples of the epoxy silane include 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, etc.

Examples of methacryloxysilane include 3-methacryloxypropylmethyldimethoxysilane, 3-methacryloxypropyltrimethoxysilane, 3-methacryloxypropylmethyldiethoxysilane, 3-methacryloxypropyltriethoxysilane, etc.

Examples of the aminosilane include N-2(aminoethyl)3-aminopropylmethyldimethoxysilane, N-2 (aminoethyl)3-aminopropyltrimethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, etc.

(Manufacturing Process)

An example of a manufacturing process of the adhesive tape 150 will be described with reference to FIGS. 7 to 8.

As shown in FIG. 7, for example, the film layer 182 having the color printing layer 181 formed thereof by a known printing technique is fed out from a film roll FR and supplied to an adhesive coating head AH. In the adhesive coating head AH, an adhesive having the composition described above is applied to a surface of the film layer 182 on the side opposite to the color printed layer 181 to form a three-layer structure of the color printing layer 181, the film layer 182, the second adhesive layer 170, before passing through a first drying chamber D1, a second drying chamber, a third drying chamber D3, a fourth drying chamber D4, and a fifth drying chamber D5 in this order so that a drying treatment is performed in five stages. The number of drying chambers is not limited to five.

Subsequently, the separation material layer 151 fed out separately from a separation material roll SR is bonded to the second adhesive layer 170 so that the tape having the three-layer structure is turned into a tape having a four-layer structure of the color printing layer 181, the film layer 182, the second adhesive layer 170, and the separation material layer 151, and the tape is then wound around a first tape roll TR1.

Subsequently, as shown in FIG. 8, the tape having the four-layer structure of the color printing layer 181, the film layer 182, the second adhesive layer 170, and the separation material layer 151 is fed out from the first tape roll TR 1 and is supplied to the adhesive coating head AH as described above. In the adhesive coating head AH, an adhesive (including the reflectors P) having the composition described above is applied to the surface of the color printing layer 181 on the side opposite to the film layer 182 to form a five-layer structure of first adhesive layer 161 (with the reflectors P added), the color printing layer 181, the film layer 182, the second adhesive layer 170, and the separation material layer 151, and the drying treatment is then performed through the first to fifth drying chambers D1 to D5 as described above to complete the adhesive tape 150. The adhesive tape 150 completed as described above is wound around a second tape roll TR2 with the first adhesive layer 161 facing inward.

Particularly in this embodiment, the color printing layer 181 is disposed between the film layer 150 and the first adhesive layer 161. As a result, a coloring function from the reflectors P of the first adhesive layer 161 and a coloring function from the color printing layer 181 can sufficiently be achieved (as compared to the case that both of the functions are mixed in one layer). Particularly, by arranging the functions such that the first adhesive layer 161 on the upper side of FIGS. 3, 5, etc. is colored by the reflectors P while the lower side of FIGS. 3, 5, etc. is colored by the color printing layer 181, both a coloring appearance and a luster appearance can visually be recognized when viewed from the upper side of FIGS. 3, 5, etc.

For example, in the case that the film layer 182 is colored, both the coloring appearance and the luster appearance can visually be recognized without disposing the color printing layer 181 between the first adhesive layer 161 and the film layer 182, as shown in FIG. 6A.

Although the adhesive tape cartridge 11 of the laminate type has been described in the embodiment, the present disclosure is also applicable to an adhesive tape cartridge of a so-called non-laminate type (also referred to as "receptor type").

(Non-Laminate Type)

In FIG. 9, the non-laminate type adhesive tape cartridge 11 includes the adhesive tape roll 14 (detailed layer configuration will be described later), the ink ribbon roll 16, the ink ribbon take-up roller 17, and the feeding roller 18 inside the housing 11A.

The adhesive tape roll 14 is formed by winding an adhesive tape 150N related to this modification example around the spool 50. As shown in enlarged views in FIG. 9, the adhesive tape 150N includes an image receiving layer 210, a transparent film layer 182A that is transparent or semitransparent (e.g., having a transmittance of 20% or less) as descried above, a color print layer 181A to which the reflectors P are added, the first adhesive layer 161 to which the reflectors P are added as descried above, and the release material layer 151 laminated in this order from the spool 50 located on the radial center side (corresponding to the upper side shown in FIG. 10 described later) toward the radial outside (corresponding to the lower side in FIG. 10 described later). The transparent film layer 182A and the color printing layer 181A constitute a base layer 180A.

<Details of Layer Configuration of Tape>

FIG. 10A is an explanatory view showing a layer configurations of the adhesive tape 150N and a print tape 100N.

As shown in FIG. 10A, the adhesive tape 150N includes the transparent film layer 182A, the image receiving layer 210 disposed in contact with the upper side of the transparent film layer 182A in FIG. 10A, the color printing layer 181A to which the reflectors P are added, disposed in contact with the lower side of the transparent film layer 182A in FIG. 10A, the first adhesive layer 161 to which the reflectors P are added, disposed in contact with the lower side of the color printing layer 181A in FIG. 10A, and the separation material layer 151 covering the first adhesive layer 161, disposed in contact with the lower side of the first adhesive layer 161 in FIG. 10A.

Instead of the first adhesive layer 161, a flexible material (viscoelastic body) having no adhesive property and flat plate-shaped reflectors kneaded therein may be used for a structure in which this flexible material is sandwiched between bases (an adhesive property is imparted to at least one of the bases). As a result, the film having an adhesive property (e.g., the first adhesive layer 161) can be made thinner while the thickness of the flexible material can arbitrarily be set, so that the existing adhesive layer can be used without change.

In the embodiment, the adhesive tape roll 14 described above has the adhesive tapes 150, 150N wound around the spool 50 with the first adhesive layer 161 facing inward; however, as respectively shown in FIGS. 11 and 12, the tapes may be sound with first adhesive layer 161 facing outward. In this case, the adhesive tape roll 14 is reversely fed as compared to the cases respectively shown in FIGS. 2 and 9. In FIGS. 11 and 12, reference numerals 7, 8 denote rollers for feeding guide of the adhesive tapes 150, 150N.

Although the base film 180 and the first adhesive layer 161 have been described in the case that the adhesive tape roll 14 wound in a roll shape is wound inward, the tape roll may be wound outward.

The adhesive tape may have a two-layer structure as shown in FIG. 13A in which the transparent film layer 182 is disposed on one side of the first adhesive layer 161 or may have a single-layer structure as shown in FIG. 13B having only a resin film layer 180' as the flexible material layer to which the flat plate-shaped reflectors P with the average particle diameter 2L made of a luster pigment are added, and the layer structure is not limited. For example, the two-layer structure shown in FIG. 13A can be applied to, for example, a seal or a tape affixed to glass from inside and viewed from the outside of the glass (i.e., from the adhesive layer side). In this case, the film layer 182 may be transparent as described above or may not be transparent.

(Others)

In all the embodiments and modification examples described above, when measuring numerical values (volume proportion, average particle diameter, adhesive force, and all others) of various parameters related to a tape, the tape is cut out into a size of 10 mm×10 mm or greater before the measurement. In this case, the average particle diameter can be measured by using, for example, "Laser Diffraction/ Scattering Type Particle Diameter Distribution Measurement Apparatus LA-960" manufactured by HORIBA, Ltd. The "particle diameter" at the time of measurement indicates spherical particles showing a scattering pattern equivalent to an obtained light scattering pattern in the laser diffraction method, while the particle diameter indicates a sphere equivalent diameter based on diffusion in the dynamic light scattering method.

The techniques of the embodiments and the modification examples may appropriately be utilized in combination other than those described above.

What is claimed is:

1. A tape roll that winds a tape with a minimum radius R, said tape before being wound comprising a flexible material layer,
   said flexible material layer comprising flat plate-shaped reflectors inside and having a thickness T,
   on condition that a flexural modulus of said reflectors is G, a bending strength of said reflectors is A, and an average particle diameter of said reflectors is 2L, said reflectors satisfy the following relationships:

$$\frac{R}{L} * \left\{1 - \cos\left(\frac{L}{R}\right)\right\} < \frac{A}{G};$$

and
2L>T.

2. The tape roll according to claim 1, further comprising a winding core member, wherein
   said tape is wound around said winding core member.

3. The tape roll according to claim 1, wherein
   said reflectors in said flexible material layer are luster pigment particles.

4. The tape roll according to claim 1, wherein
   each of said reflectors comprises:
      a base material; and
      a covering material that covers a surface of said base material.

5. The tape roll according to claim 4, wherein
   said base material of each of said reflectors has a flat plate shape.

6. The tape roll according to claim 4, wherein
   said base material comprises an inorganic compound, a metal oxide, a metal, or a liquid crystal polymer.

7. The tape roll according to claim 4, wherein
said tape further comprises a base layer, and wherein
said flexible material layer is a first adhesive layer disposed in contact with one side of said base layer in a thickness direction.

8. The tape roll according to claim 7, wherein
said base layer is a layer that reflects a light.

9. The tape roll according to claim 7, wherein
said base layer is a layer that transmits a light.

10. The tape roll according to claim 7, further comprising another flexible material layer on the side opposite to said flexible material layer across said base layer.

11. The tape roll according to claim 4, wherein
said tape further comprises a base layer, wherein
said base layer comprises:
a film layer; and
a colored layer disposed in contact with said one side of said film layer in said thickness direction and disposed in contact with the other side of said flexible material layer in said thickness direction, and wherein
said flexible material layer is a first adhesive layer that is colorless transparent.

12. The tape roll according to claim 4, wherein
said covering material comprises at least any of a silicon oxide, a metal, and a metal oxide.

13. A tape cartridge comprising a tape roll that winds a tape with a minimum radius R in a housing,
said tape before being wound comprising a flexible material layer,
said flexible material layer comprising flat plate-shaped reflectors inside and having a thickness T,
on condition that a flexural modulus of said reflectors is G, a bending strength of said reflectors is A, and an average particle diameter of said reflectors is 2L, said reflectors satisfy said following relationships:

$R/L\{1-\cos(L/R)\}<A/G;$ and
$2L>T$.

14. The tape cartridge according to claim 13, wherein
said flexible material layer is a first adhesive layer, and wherein
in said housing, said tape cartridge further comprises:
a cover film roll that winds a cover film to be bonded to one side of said first adhesive layer of said tape in a thickness direction, and
an ink ribbon roll that winds an ink ribbon configured to transfer ink to the other side of said cover film in said thickness direction, the cover film being fed out from said cover film roll.

15. A method for manufacturing a tape roll wound with a minimum radius R, comprising:
allowing a tape that comprises a flexible material layer having a thickness T to comprise flat plate-shaped reflectors that satisfy $R/L\{1-\cos(L/R)\}<A/G$, and $2L>T$, on condition that a flexural modulus of said reflectors is G, a bending strength of said reflectors is A, and an average particle diameter of said reflectors is 2L; and
subsequently winding said tape with a minimum radius R.

* * * * *

UNITED STATES PATENT AND TRADEMARK OFFICE
CERTIFICATE OF CORRECTION

PATENT NO. : 11,065,839 B2  
APPLICATION NO. : 16/144377  
DATED : July 20, 2021  
INVENTOR(S) : Chisato Yoshimura, Yoshikatsu Suito and Chie Nakashima Page 1 of 1

It is certified that error appears in the above-identified patent and that said Letters Patent is hereby corrected as shown below:

On the Title Page

Item (57), in the Abstract, Line 9, Delete "R/L{1-cos(L/R)}<A/G," and insert:

$$\text{-- } \frac{R}{L} * \left\{1 - \cos\left(\frac{L}{R}\right)\right\} < \frac{A}{G}, \text{ --}$$

In the Specification

Column 6, Detailed Description, Line 42, Delete "R/L{1-cos(L/R)}." and insert:

$$\text{-- } \frac{R}{L} * \left\{1 - \cos\left(\frac{L}{R}\right)\right\}. \text{ --}$$

Column 7, Detailed Description, Line 35, Delete "R/L{1-cos(L/R)}<A/G." and insert:

$$\text{-- } \frac{R}{L} * \left\{1 - \cos\left(\frac{L}{R}\right)\right\} < \frac{A}{G}. \text{ --}$$

In the Claims

Column 14, Line 5, Delete "R/L{1-cos(L/R)}<A/G;" and insert:

$$\text{-- } \frac{R}{L} * \left\{1 - \cos\left(\frac{L}{R}\right)\right\} < \frac{A}{G}; \text{ --}$$

Column 14, Line 25, Delete "R/L{1-cos(L/R)}<A/G," and insert:

$$\text{-- } \frac{R}{L} * \left\{1 - \cos\left(\frac{L}{R}\right)\right\} < \frac{A}{G}, \text{ --}$$

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*